United States Patent
Reichle

(12) 
(10) Patent No.: US 6,318,904 B1
(45) Date of Patent: Nov. 20, 2001

(54) CONTACT CONNECTOR SYSTEM FOR LIGHT WAVEGUIDES

(75) Inventor: Hans Reichle, Wetzikon (CH)

(73) Assignee: Reichle & De-Massari AG, Wetzikon (CH)

( * ) Notice: Subject to any disclaimer, the term of this patent is extended or adjusted under 35 U.S.C. 154(b) by 0 days.

(21) Appl. No.: 09/403,278

(22) PCT Filed: Feb. 10, 1999

(86) PCT No.: PCT/CH99/00061

§ 371 Date: Oct. 18, 1999

§ 102(e) Date: Oct. 18, 1999

(87) PCT Pub. No.: WO99/42877

PCT Pub. Date: Aug. 26, 1999

(30) Foreign Application Priority Data

Feb. 17, 1998 (CH) .................................................. 377/98

(51) Int. Cl.⁷ .............................. G02B 6/36; G02B 6/42
(52) U.S. Cl. ............................................. 385/78; 385/139
(58) Field of Search ........................ 385/53–94, 134–139, 385/39, 40

(56) References Cited

U.S. PATENT DOCUMENTS

| | | | |
|---|---|---|---|
| 5,293,581 | * 3/1994 | DiMarco | ................................ 385/76 |
| 5,381,498 | 1/1995 | Bylander | ................................ 385/83 |
| 5,561,727 | * 10/1996 | Akita et al. | ............................ 385/88 |
| 5,598,495 | * 1/1997 | Rittle et al. | ............................ 385/75 |
| 5,748,821 | * 5/1998 | Schempp et al. | ....................... 385/76 |

FOREIGN PATENT DOCUMENTS

| | | |
|---|---|---|
| 0 677 757 | 10/1995 | (EP) . |
| 0 689 069 | 12/1995 | (EP) . |

* cited by examiner

*Primary Examiner*—Akm E. Ullah
*Assistant Examiner*—Michelle R. Connelly-Cushwa
(74) *Attorney, Agent, or Firm*—Venable; Gabor J. Kelemen

(57) ABSTRACT

The contact connector arrangement for optical waveguides of the internationally standardized SC connector whose connection ends are each formed by a male connector comprises a connector housing (7) which receives at least two male connectors (6), is used for the manual handling of the plug-in process and cooperates by way of coupling means (8) in a positive locking manner with predetermined plug-in openings of an electric connector system RJ 45 or RJ 11 or the like. This ensures that the connection ends of optical waveguides which are readily manufactured as male connectors can be used directly for modular electric connector systems such as RJ 45 or RJ 11.

6 Claims, 1 Drawing Sheet

CONTACT CONNECTOR SYSTEM FOR LIGHT WAVEGUIDES

The present invention relates to a contact connector arrangement for optical waveguides of the internationally standardized SC-type connector whose connection ends are each formed by a male connector.

The highly sensitive connector ends of optical waveguides are readily manufactured for plug-and-socket connection in order to allow their handling. For this purpose the optical waveguides end by way of an anti-kink means in a crimping sleeve and an end ferrule which are enclosed by a male connector.

The problematic aspect in this respect is, however, that such male connectors cannot be used without any further measures for the currently mostly common modular electric connector systems such as RJ 45 or RJ 11, because the cross section of the male connectors does not coincide with the plug-in openings of the electric connector systems.

It is therefore the object of the presention invention to provide a contact connector arrangement for optical waveguides of the internationally standardized SC connector with connector ends which are each formed by a male connector and have the cross-sectional dimensions of modular electric connector systems such as RJ 45 or RJ 11.

This is at first achieved in accordance with the invention by a connector housing receiving at least two male connectors and being used for the manual handling of the plug-in process, which housing cooperates in a positive locking manner by way of coupling means with predetermined plug-in openings of an electric connector system RJ 45 or RJ 11 or the like.

As a result of these measures it is now possible to directly use the connection ends of optical waveguides which are manufactured as male connectors for modular electric connector systems such as RJ 45 or RJ 11, with the in-line arrangement of the coupling means in accordance with the invention further providing a compact design.

A preferred embodiment of the contact connector arrangement in accordance with the invention can be seen further in that the coupling means comprise two substantially similar housing parts which are connected by way of flange means or the like and which enclose means used for establishing contact such as latch means and plug sockets, and further if the housing parts are arranged in a positive locking manner with respect to the predetermined plug-in openings, further if the housing part is used for the detachable insertion of the connector housing with the male connectors on the ends of the optical waveguides, and if further guide grooves are arranged on the housing parts and cam followers on the connector housing and if the connector housing cooperates with the respective housing part by way of catch means.

Figure 1:
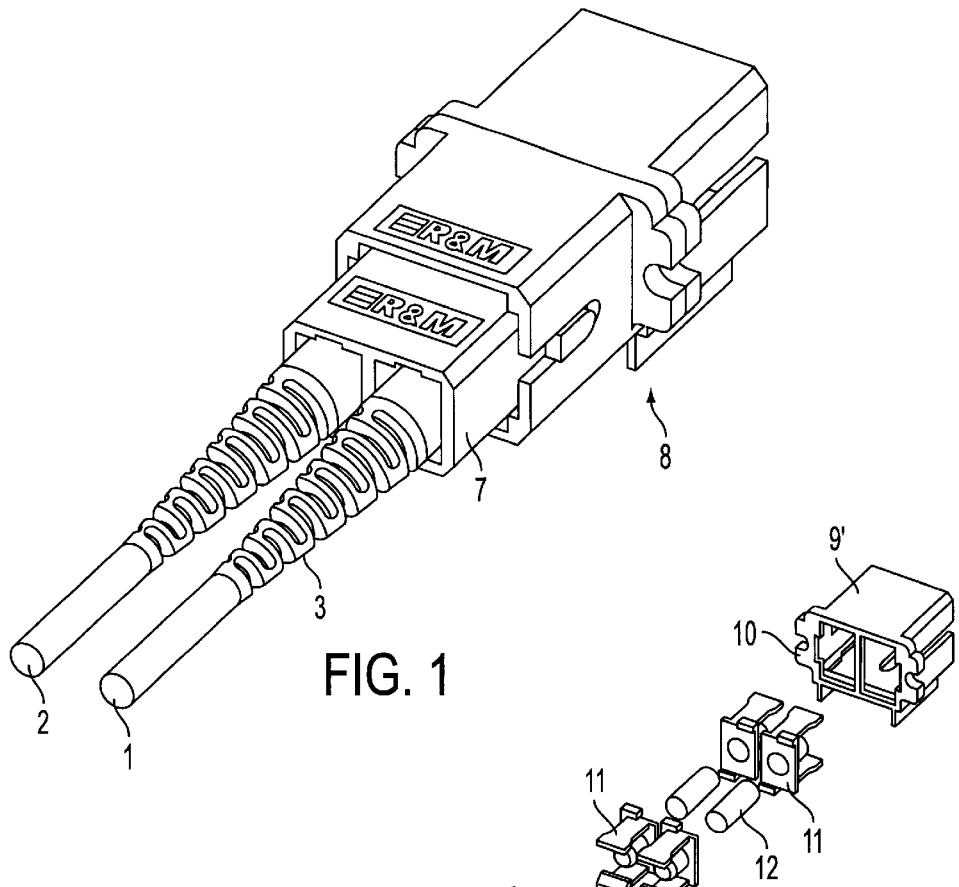
Figure 2:
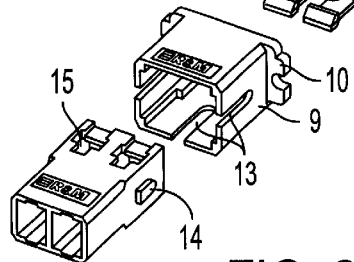
Figure 2:
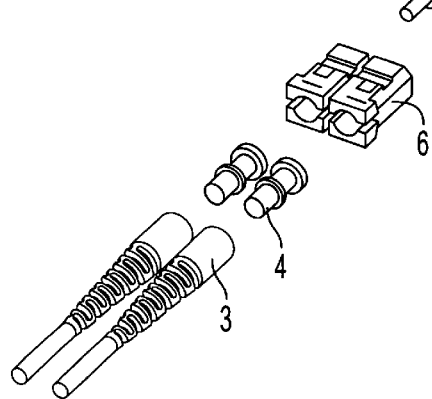

Exemplary embodiments of the subject matter of the invention are explained below by reference to the enclosed drawings, wherein:

FIG. 1 shows a contact connector arrangement for optical waveguides in a diagrammatic representation and FIG. 2 shows the arrangement according to FIG. 1 in an exploded view on a smaller scale.

The contact connector arrangement is provided here for two optical waveguides 1 and 2 of the internationally standardized SC connector whose connection ends each end via an anti-kink means 3 in a crimping sleeve 4 and an end ferrule 5 which are enclosed by a male connector 6.

In accordance with the invention, a connector housing 7 is provided which receives at least and in this case two male connectors 6, is used for the manual handling of the plug-in process and cooperates in a positively locking manner by way of coupling means 8 with predetermined, internationally standardized plug-in openings (not shown) of an electric connector system such as RJ 45 or RJ 11.

The coupling means comprise two essentially similar housing parts 9, 9' which are connected by way of flange means 10 or even catch means and the like and which enclose means used for establishing contact such as latch means 11 and plug sockets 12.

The housing parts 9, 9' are arranged in a positive locking manner with the aforementioned plug-in openings.

Furthermore, such a housing part 9, 9' is used for the detachable insertion of the connector housing 7 with the male connectors 6 on the ends of the optical waveguides 1 and 2. For this purpose guide grooves 13 can be provided on the housing parts 9, 9' and cam followers 14 on the connector housing 7. Moreover, the connector housing 7 can also cooperate with the respective housing part 9, 9' by way of catch means 15.

These measures ensure that the connection ends of optical waveguides which are readily manufactured as male connectors can be used directly for modular electric connector systems such as RJ 45 or RJ 11, with the in-line arrangement of the coupling means in accordance with the invention further providing a compact design.

Protection is claimed as follows:

1. A contact connector arrangement for optical waveguides of the internationally standardized SC connector whose connection ends are each formed by a male connector, said contact connector arrangement comprising a connector housing which receives at least two male connectors and cooperates by way of coupling means in a positive locking manner with predetermined plug-in openings of an electric connector system, wherein said coupling means comprise two substantially similar housing parts which are connected by way of flange means and which enclose means used for establishing contact.

2. A contact connector arrangement as claimed in claim 1, wherein said enclosed means used for establishing contact are latch means and plug sockets.

3. A contact connector arrangement as claimed in claim 1, wherein said housing parts are arranged in a positive locking manner with respect to said predetermined plug-in openings.

4. A contact connector arrangement as claimed in claim 1, wherein said connector housing containing said male connectors on the ends of the optical waveguides can be detachably inserted into one of said housing parts.

5. A contact connector arrangement as claimed in claim 4, wherein guide grooves are arranged on said housing parts and cam followers on said connector housing.

6. A contact connector arrangement as claimed in claim 5, wherein said connector housing cooperates with one of said respective housing parts by way of catch means.

* * * * *